Oct. 14, 1958 S. H. NORTON 2,855,915
VALVE CAP ASSEMBLY
Filed Dec. 13, 1956 2 Sheets-Sheet 1
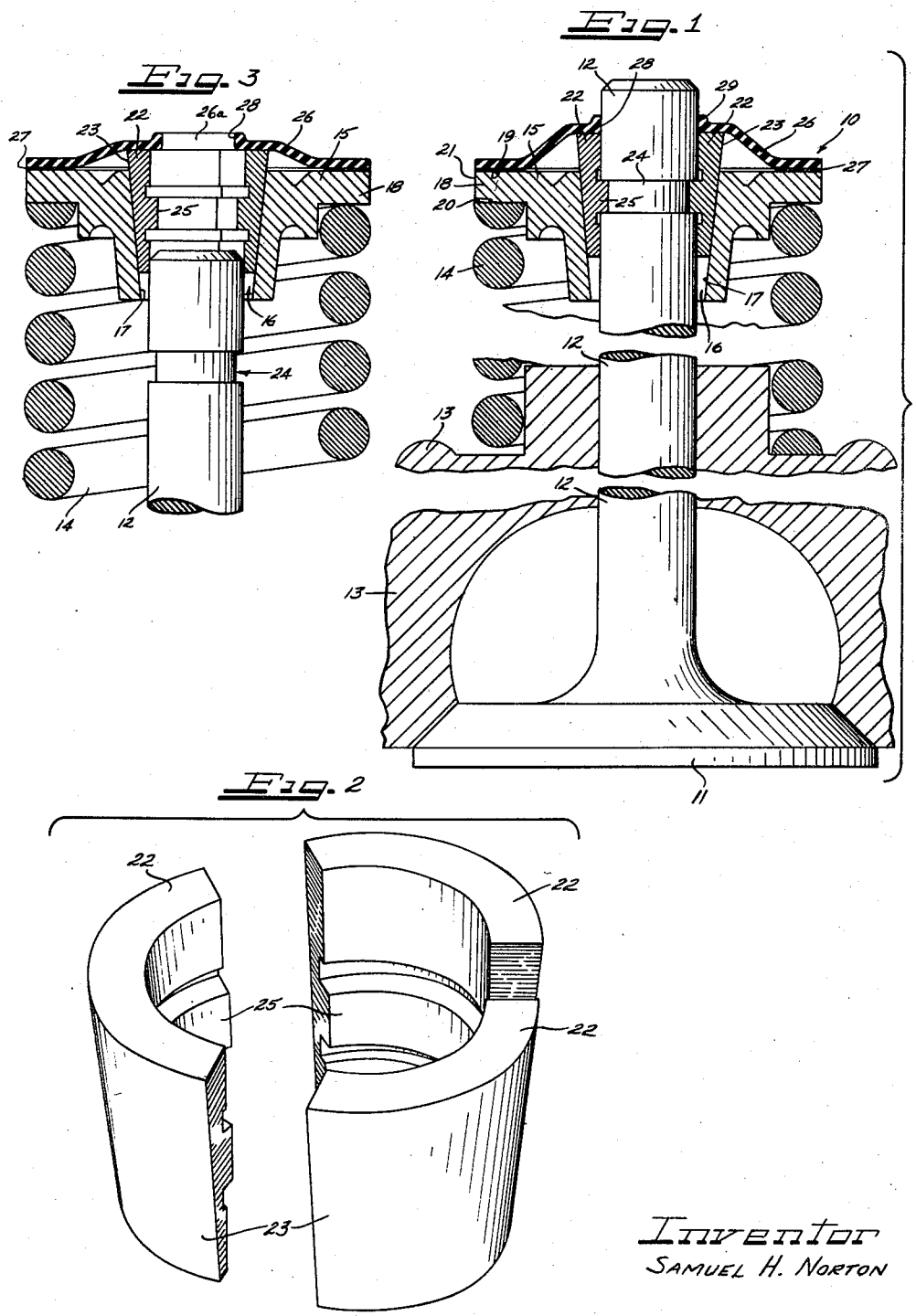
Inventor
SAMUEL H. NORTON
by Hill, Sherman, Meroni, Gross & Simpson Attys.

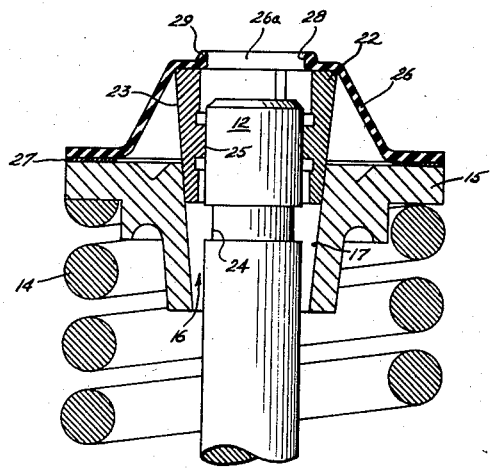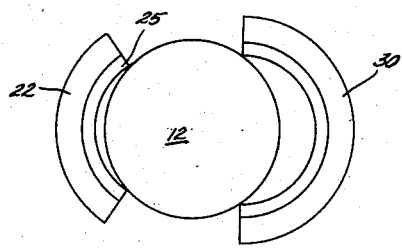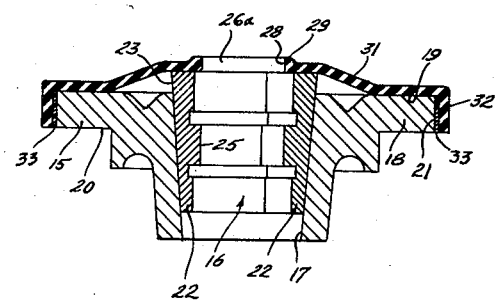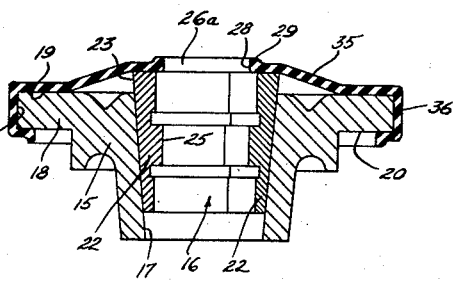

United States Patent Office 2,855,915
Patented Oct. 14, 1958

2,855,915

VALVE CAP ASSEMBLY

Samuel H. Norton, University Heights, Ohio, assignor to Thompson Products, Inc., Cleveland, Ohio, a corporation of Ohio Application December 13, 1956, Serial No. 628,096

20 Claims. (Cl. 123—188)

This invention relates to a lock and seal assembly for a valve stem, as well as locks and seals for valve stems.

Intake and exhaust valves of automotive engines are yieldably secured in the engine, being biased to a closed position by a valve spring. The valve spring acts between a stationary portion of the engine and the valve stem. The connection between the movable end of the spring and the valve stem usually comprises a cap having a bore therein in which is received a pair of locks which engage the valve cap and which also engage the valve stem.

It has been observed that lubricating oil in the engine passes along the valve stem between the stem and the locks as well as between the valve stem cap and the locks and continues along the stem to mix with inlet or exhaust gases, thereby causing objectionable smoking of the engine at the exhaust.

It has also been observed that considerable fumbling and difficulty is encountered when the valve cap and the two lock halves are being assembled with the valve spring and valve. This assembling necessitates the labor of picking up each of the parts named and fitting them together against the force of the spring.

Accordingly, I have invented a valve cap assembly which eliminates either or both of the foregoing difficulties.

Accordingly, it is an object of this invention to provide a sub-assembly of the parts used with the valve stem.

It is also an object of this invention to provide a sub-assembly of parts which can be assembled onto the valve as a single unit, thereby facilitating the assembling.

Another object of this invention is the elimination of the labor of picking up more than one part each time a cap is assembled onto a valve stem.

Still another object of this invention is the provision of a cap and oil seal assembly that can be secured to a valve stem as a unit.

Yet another object of this invention is the elimination of any auxiliary seal.

Still another object of this invention is the provision of an element which will serve to lock the parts together and/or provide a sealing function.

Yet another object of this invention is the provision of a novel structure which will remain assembled due to its own characteristics.

A still further object is the reduction of the cost of labor of assembling a valve to its associated parts.

Still another object of this invention is the provision of a resilient seal that can be snapped into place.

A still further object is the provision of a resilient seal which can be secured to the cap by permanent means.

Other objects, features and advantages of this invention will be apparent from the following detailed description of the attached sheets of drawings, which by way of a preferred embodiment together with modifications thereof illustrate the invention.

On the drawings:

Figure 1 is an elevational view, partly in section, illustrating the valve cap assembly;

Figure 2 is a perspective view of the locks used in the structure of Figure 1;

Figures 3 and 4 illustrate steps in securing the sub-assembly to a valve stem as shown in Figure 1;

Figure 5 is a schematic comparison of the present invention with a prior structure;

Figure 6 is a modification of this invention; and

Figure 7 is a still further modification of the invention shown herein.

As shown on the drawings:

Referring to Figure 1, there is shown a valve cap assembly or sub-assembly generally indicated by the numeral 10 installed on a valve 11, and surrounding the valve stem 12. The valve 11, in turn, is installed in a portion of the engine 13 which supports a valve spring 14 which bears against the valve cap assembly 10.

The valve cap assembly shown in Figure 1 comprises a valve cap 15 which has a bore 16 therethrough defined by an inner surface 17. The bore 16 is preferably, but not necessarily made in a tapered fashion. The cap 15 also has an annular flange 18 which has an upper annular face 19 and a lower annular face 20. It can be seen that the lower annular face 20 is in contact with the valve spring 14. Since spring 14 is under compression, an upward force is thereby directed against the lower face 20 of the cap 15. Between the upper and lower faces of flange 18, the cap flange 18 has an outer edge 21.

Within the bore 16 of the cap 15, there are positioned three locks, each numbered 22 and also shown in Figure 2. Preferably, but not necessarily, these locks are made identical to each other. The locks have an outer surface 23 which mates with the surface 17 of the cap 15 as shown in Figure 1. The locks have here been shown as having an outer surface 23 which is tapered correspondingly to inner surface 17 of the cap. While it is preferable that both of these surfaces be tapered, it will be apparent from the description which follows that an operative combination needs to have only one tapered surface i. e. surface 17 or surface 23. When the locks are brought together from the position shown in Figure 2 to the position shown in Figure 1, the locks 22 collectively define an opening in which the stem 12 of the valve 11 is received. Any convenient means may be provided on the inner surface of each of the locks 22 and on the outer surface of stem 12 to produce a locking engagement therebetween. In the form illustrated in Figure 1, the stem 12 has a groove or channel 24 into which are received inwardly directed shoulders 25 on locks 22. It has been customary in the past to use two locks for the purpose described here.

One feature of one form of this invention is that at least three locks 22 are utilized. When workmen have been assembling parts available in the past, they have found that it takes a good deal of skill and that some fumbling is involved in forcing the two lock halves, the cap and the valve spring together onto the valve stem. As such, it has been heretofore thought that the addition of any further parts would make the structure too complex to assemble. Thus, while I have increased the number of parts, it will be shown later that the use of an increased number of parts, namely at least three locks 22, taken with another feature of this invention presently to be described, actually simplifies the assembling considerably.

The valve cap assemly 10 also has a resilient member 26 typically made of rubber which here has the form of a diaphragm. The resilient member is annularly secured to the flange 18 along the upper face 19 as by cement or other bonding 27. The resilient member or diaphragm 26 has an opening 26a best seen in Figure 3 which is defined by a resilient inner edge 28. Preferably, a reinforcing bead 29 also extends around the opening. The inner edge 28 is so proportioned and dimensioned as to correspond to the size and shape of valve stem 12, the opening 26a in one form being slightly smaller than the stem, whereby, as best seen in Figure 1, a snug fit between the inner edge 28 and the stem 12 produces an oil seal which is here illustrated as being static. Thus lubricating oil reaching the upper end of stem 12 will be blocked by the resulting oil seal and be shieldingly directed outwardly across the upper surface of the resilient member or diaphragm 26, and thereby prevented from following either the inner or outer surface of locks 22 and stem 12 to reach the space adjacent to the valve itself. Thus it can be seen that the resilient member 26 together with the cement or bond 27 must be oil-resistant.

As best seen in Figure 3, it is apparent that the cap 15, the locks 22, and the resilient member 26 together make up a unitized sub-assembly which stays assembled. The resilient member 26, being normally flat, exerts a downward force on the locks 22 which presses them into the bore 16 of the cap 15. Since either or both of inner surface 17 and outer surface 23 are tapered, the locks are brought together from the position shown in Figure 2 to that shown in Figure 3. When brought together, each of the locks acts as a keystone and prevents the others from falling inwardly. Thus a preassembled sub-assembly of unitized structure is made available.

It can also be seen that if the opening 26a were made larger, a unitized structure would result which lacks the seal feature, but which nevertheless retains the unitized structure feature.

Referring to Figure 3, when the valve stem 12 and the valve spring 14 have been placed in position ready for assembly, the valve cap assembly 10 may be placed above the spring and stem in such a manner that the end of stem 12 enters the opening jointly defined by the locks as shown in Figure 3. The upper end of the spring engages the flange 18 of the cap 15. When these parts have been piloted as shown in Figure 3, a force is exerted on the valve cap asesmbly 10 so as to cause compression of spring 14. It will be seen that the outer end of stem 12 first engages shoulders 25 and thereby forces locks 22 upwardly against the force of resilient member 26 which yields. At the same time, the locks 22 are cammed outwardly by the stem at a rate governed by the taper angle. (Thus, if the outer surface of the locks and the inner surface of the cap each have a taper, a certain outward rate of movement is obtained as a function of their vertical displacement. If only one of these surfaces were tapered, a taper angle twice as great would be necessary to obtain the same rate of outward displacement.) This outward displacement continues as a function of the upward displacement until the shoulders 25 have moved apart a sufficient distance to admit the stem 12 as shown in Figure 4. When stem 12 passes and slides along the shoulders 25 of locks 22, the resilient member 26, being under tension, holds the locks against the stem 12. When the cap assembly is moved downwardly further, the shoulders 25 engage the channel 24 as shown in Figure 1. As soon as shoulders 25 are in line with channel 24, the downward force caused by resilient member 26 forces shoulders 25 slightly into channel 24 with a snap action and upon the release of the compressive assembling force, or upon lowering of the valve 11 the cap assembly 10 moves relatively upwardly. Upon such release or lowering, the combined action of the shoulders 25, the channel 24, and the tapered surface or surfaces forces the cap 15 relatively upwardly with respect to the locks 22 until the relationship shown in Figure 1 is established. Here the locks are forced tightly around the stem by the combined action of the various parts.

Referring to Figure 5, there is illustrated in diagrammatic form the advantage of using three or more locks 22 in the structure. As has been noted in Figure 4, the stem 12 cannot pass between shoulders 25 until the locks have been raised a sufficient distance to permit an opening between shoulders 25 which is as larger as the diametral dimension of the end of stem 12. The upward and lateral displacement of one of locks 22 illustrated in Figure 4 is shown in Figure 5 from the top. Thus it is apparent from Figure 5 that when the corners of shoulder 25 are contacting the round surface of the valve stem 12, the locks are not separated as much as they would be if the locks 22 were made in two pieces, each being a half circle as illustrated by the lock 30. This is extremely important because in order to separate the locks, it is necessary to raise them upwardly in an inner bore of cap 15. Thus, as shown in Figures 4 and 5 the lock 22 does not need to be raised with respect to cap 15 as far as would such locks as lock 30. While both locks 22 and 30 produce wedging, only locks 22 produce a keystone effect.

Referring to Figure 6 there is shown a slightly modified form of construction. Locks 22 and the cap 15 are the same as that shown in Figure 1. The resilient member or diaphragm 31 is secured slightly differently in that it has a transverse diaphragm flange 32 which is cemented or bonded at 33 to the outer edge 21 of the flange 18. It can be seen that this structure also provides annular securement between the resilient member and the cap. One advantage of this structure is that a comparatively longer active portion of the resilient member is available for stretching.

Referring to Figure 7, a still further modification of the structures shown in Figures 1 and 6 is given. This structure, as drawn, would require a valve spring which has a smaller outside diameter than spring 14. Of course, the flange 18 of the cap 15 may be lengthened from that shown so as to accommodate the same spring as shown in the other views. The locks 22 are the same as has already been described. The main difference in this modification is in the form or structure of the resilient member or diaphragm 35 at its point of attachment. This diaphragm is also free to extend as is the structure of Figure 6. This diaphragm has a transverse diaphragm flange 36 which may also be described as being an L-shaped annular lip which engages the lower face 20 of the flange 18. It will be noted that the structure of Figure 7 may be assembled without the use of cement or bonding, the resilient member or diaphragm 35 merely snapping in place to hold the locks within the bore. While bonded forms such as shown in Figures 1 and 6 more readily lend themselves to high volume factory production, the structure shown in Figure 7 is preferable as a replacement or spare part, since a serviceman can easily assemble or disassemble it.

Since the structures of Figures 6 and 7 differ from that of Figure 1 primarily in the resilient member and its attachment to the valve cap 15, it is apparent that their operation, assembly and installation are identical to that already described.

Thus a structure has been provided which is a sub-assembly of the various parts to be used with the valve stem. This sub-assembly can be pre-assembled as shown and may be secured to the valve stem as a single unit by a very inexpensive simple single operation which does not involve the picking up of more than one part, namely the sub-assembly. Thereby assembling labor at the final stages of engine assembly has been reduced. Fumbling and other dropping of parts which are difficult to hold in proper position with respect to each other has also been eliminated. Further, the optional feature of a seal has also been included herein, and, of course, this optional feature may be the primary feature of interest in a particular application. Also, resilient seals have been provided which can be cemented, vulcanized, or otherwise bonded to the cap, and a resilient seal has also been provided which may be snapped over the edge of the cap. The resulting structure avoids the awkward and tedious process of slipping the two small wedge locks in place around the valve stem when the valve spring is compressed. Instead, these small and hard-to-hold parts are held together as a unit, the yieldable resilient holding means also serving, where desired, to prevent an excessive amount of oil seeping down the valve stem into the motor. Thereby poor engine running and engine smoking when due to this cause have also been eliminated.

It will be understood that numerous modifications and variations may be effected without departing from the scope of the novel concepts of the present invention.

I claim as my invention:

1. A preassembled valve cap assembly for attachment as a unit to the annularly lock-grooved end of a valve stem comprising, in combination, a valve cap having a bore therethrough; a plurality of locks received in said bore and together defining an opening for the valve stem; and a resilient member securely joined to said cap and yieldably urging said locks axially into the bore of said cap.

2. A preassembled valve cap assembly for attachment as a unit to the annularly lock-grooved end of a valve stem comprising, in combination, a valve cap having a bore therethrough; a plurality of locks received in said bore and together defining an opening for the valve stem; and a resilient diaphragm member securely joined to said cap remotely from said locks and yieldably urging said locks axially into the bore of said cap.

3. A preassembled valve cap assembly for attachment as a unit to the annularly lock-grooved end of a valve stem comprising, in combination, a valve cap having a bore therethrough; a plurality of locks received in said bore and together defining an opening for the valve stem; and a resilient diaphragm member bonded to said cap remotely from said locks and yieldably urging said locks axially into the bore of said cap.

4. A preassembled valve cap assembly for attachment as a unit to the annularly lock-grooved end of a valve stem comprising, in combination, a valve cap having a bore therethrough; a plurality of locks received in said bore and together defining an opening for the valve stem; and a resilient diaphragm member having a flange directed transversely to the other portions of the diaphragm; and means including said flange joining said diaphragm to said cap, said diaphragm yieldably urging said locks axially into the bore of said cap.

5. A preassembled valve cap assembly for attachment as a unit to the annularly lock-grooved end of a valve stem comprising, in combination, a valve cap having a cap flange with annular upper and lower faces and a bore therethrough; a plurality of locks received in said bore and together defining an opening for the valve stem; and a resilient diaphragm member joined to said cap flange at one of said annular faces, said diaphragm yieldably urging said locks axially into the bore of said cap.

6. A preassembled valve cap assembly for attachment as a unit to the annularly lock-grooved end of a valve stem comprising, in combination, a valve cap having a cap flange with an annular upper face and a bore therethrough; a plurality of locks received in said bore and together defining an opening for the valve stem; and a resilient diaphragm member bonded to said cap flange at said upper annular face, said diaphragm yieldably urging said locks axially into the bore of said cap.

7. A preassembled valve cap assembly for attachment as a unit to the annularly lock-grooved end of a valve stem comprising, in combination, a valve cap having a cap flange with an annular lower face and a bore therethrough; a plurality of locks received in said bore and together defining an opening for the valve stem; and a resilient diaphragm member having means securing said member to said cap flange, said means comprising an inwardly directed resilient annular lip secured to the outer edge of said diaphragm member, said lip surrounding said flange and engaging said lower face, said diaphragm yieldably urging said locks axially into the bore of said cap.

8. A preassembled valve cap assembly for attachment as a unit to the annularly lock-grooved end of a valve stem comprising, in combination, a valve cap having a flange with an outer edge, said cap having a bore therethrough; a plurality of locks received in said bore and together defining an opening for the valve stem; and a resilient diaphragm member having means securing said member to said cap flange, said means comprising a diaphragm flange directed transversely to the other portion of the diaphragm and secured to said outer edge of said cap flange, said diaphragm yieldably urging said locks axially into the bore of said cap.

9. A preassembled valve cap assembly for attachment as a unit to the annularly lock-grooved end of a valve stem comprising, in combination, a valve cap having a bore therethrough; a plurality of locks received in said bore and together defining an opening for the valve stem; and a resilient member acting between said locks and said cap yieldably urging said locks axially into the bore of said cap.

10. A preassembled valve cap assembly for attachment as a unit to the annularly lock-grooved end of a valve stem comprising, in combination, a valve cap having an inner surface defining a bore therethrough, and also having a cap flange with an annular upper face; three locks received in said bore and together defining an outer surface received in said cap and together defining an opening for the valve stem; both of said surfaces being tapered; and a resilient diaphragm member bonded to said cap flange at said annular upper face, said diaphragm yieldably urging said locks axially into the bore of said cap.

11. A preassembled valve cap assembly for attachment as a unit to the annularly lock-grooved end of a valve stem comprising, in combination, a valve cap having an inner surface defining a bore therethrough, and having a cap flange with an annular lower face; three locks received in said bore and together defining an outer surface received in said cap and together defining an opening for the valve stem; both of said surfaces being tapered; and a resilient diaphragm member having means securing said member to said cap flange, said means comprising an inwardly directed resilient annular lip secured to the outer edge of said diaphragm member, said lip surrounding said flange and engaging said lower face; said diaphragm yieldably urging said lock axially into the bore of said caps.

12. A preassembled valve cap assembly for attachment as a unit to the annularly lock-grooved end of a valve stem comprising, in combination, a valve cap having an inner surface defining a bore therethrough, and also having a cap flange with an outer edge; three locks received in said bore and together defining an outer surface received in said cap and together defining an opening for the valve stem; both of said surfaces being tapered; and a resilient diaphragm member having means securely joining said member to said cap flange, said means comprising a diaphragm flange directed transversely to the other portions of the diaphragm and secured to said outer edge of said cap flange, said diaphragm yieldably urging said locks axially into the bore of said cap.

13. A preassembled valve cap assembly for attachment as a unit to the annularly lock-grooved end of a valve stem comprising, in combination, a valve cap having a bore therethrough; a plurality of locks received in said bore and together defining an opening for the valve stem; and a resilient member acting between said locks and said cap yieldably urging said locks axially into the bore of said cap; said member having a hole therein defined by a resilient inner edge, said hole registering with said bore whereby said bore and said hole may receive the valve stem, said resilient edge being dimensioned correspondingly to the stem for sealing engagement therewith.

14. A preassembled valve cap assembly for attachment as a unit to the annularly lock-grooved end of a valve stem comprising, in combination, a valve cap having a bore therethrough; a plurality of locks received in said bore and together defining an opening for the valve stem; and a resilient diaphragm member securely joined to said cap remotely from said locks and yieldably urging said locks axially into the bore of said cap, said member having a hole therein defined by a resilient inner edge, said hole registering with said bore whereby said bore and said hole may receive the valve stem, said resilient edge being dimensioned correspondingly to the stem for sealing engagement therewith.

15. A preassembled valve cap assembly for attachment as a unit to the annularly lock-grooved end of a valve stem comprising, in combination, a valve cap having an inner surface defining a bore therethrough, and also having a cap flange with an annular upper face; three locks received in said bore and together defining an outer surface received in said cap and together defining an opening for the valve stem; both of said surfaces being tapered; and a resilient diaphragm member bonded to said cap flange at said annular upper face, said diaphragm yieldably urging said locks axially into the bore of said cap, and holding them together as a unitized assembly; said member having a hole therein defined by a resilient inner edge; said hole registering with said bore whereby said bore and said hole may receive the valve stem; said resilient edge being similarly shaped to and dimensioned smaller than the stem for creating a static oil seal therewith.

16. A preassembled valve cap assembly for attachment as a unit to the annularly lock-groove end of a valve stem comprising, in combination, a valve cap having an inner surface defining a bore therethrough, and having a cap flange with an annular lower face; three locks received in said bore and together defining an outer surface received in said cap and together defining an opening for the valve stem; both of said surfaces being tapered; and a resilient diaphragm member having means securing said member to said cap flange, said means comprising an inwardly directed resilient annular lip secured to the outer edge of said diaphragm member, said lip surrounding said flange and engaging said lower face; said diaphragm yieldably urging said locks axially into the bore of said caps, and holding them together as a unitized assembly; said member having a hole therein defined by a resilient inner edge; said hole registering with said bore whereby said bore and said hole may receive the valve stem; said resilient edge being similarly shaped to and dimensioned smaller than the stem for creating a static oil seal therewith.

17. A preassembled valve cap assembly for attachment as a unit to the annularly lock-grooved end of a valve stem comprising, in combination, a valve cap having an inner surface defining a bore therethrough, and also having a cap flange with an outer edge; three locks received in said bore and together defining an outer surface received in said cap and together defining an opening for the valve stem; both of said surfaces being tapered; and a resilient diaphragm member having means securing said member to said cap flange, said means comprising a diaphragm flange directed transversely to the other portions of the diaphragm and secured to said outer edge of said cap flange, said diaphragm yieldably urging said locks axially into the bore of said cap, and holding them together as a unitized assembly; said member having a hole therein defined by a resilient inner edge; said hole registering with said bore whereby said bore and said hole may receive the valve stem; said resilient edge being similarly shaped to and dimensioned smaller than the stem for creating a static oil seal therewith.

18. A preassembled valve cap assembly for attachment as a unit to the annularly lock-grooved end of a valve stem, comprising, a valve cap means; a plurality of lock means engaging said cap and adapted for engaging the stem groove; and a resilient means yieldably acting between said lock means and said cap means and holding each of said means together as a unitized snap-on assembly.

19. A preassembled valve cap assembly for attachment as a unit to the annularly lock-grooved end of a valve stem, comprising, a valve cap means; a plurality of lock means engaging said cap and adapted for engaging the stem groove; and a resilient means yieldably acting between said lock means and said cap means and holding each of said means together as a unitized snap-on assembly, said resilient means having a resilient inner edge defining a hole therein for receiving said valve stem and for establishing a seal therewith.

20. In combination, a valve having a stem guided for reciprocation along a line parallel to said stem; a preassembled valve cap assembly attached as a unit to said stem and having positive driving engagement therewith, and resilient means acting on said cap assembly for biasing said stem in one direction.

References Cited in the file of this patent

UNITED STATES PATENTS

| | | |
|---|---|---|
| 1,696,797 | Fornaca | Dec. 25, 1928 |
| 1,857,005 | Schotthoefer | May 3, 1932 |
| 2,732,836 | Phillips | Jan. 31, 1956 |
| 2,759,466 | Heimbuch | Aug. 21, 1956 |